United States Patent [19]

Kuriyama et al.

[11] Patent Number: 5,111,784
[45] Date of Patent: May 12, 1992

[54] APPARATUS FOR REDUCING VIBRATIONS OF THE BODY OF A VEHICLE

[75] Inventors: Shigeru Kuriyama; Yuji Maeda, both of Katsuta; Yozo Nakamura, Ibaraki; Kenichi Nakamura; Keiichi Mashino, both of Katsuta; Yuzo Kadomukai, Ibaraki; Masao Fukushima, Machida; Kei Murakami, Zama, all of Japan

[73] Assignees: Hitachi, Ltd., Tokyo; Nissan Motor Co., Ltd., Yokohama, both of Japan

[21] Appl. No.: 649,500

[22] Filed: Feb. 1, 1991

[30] Foreign Application Priority Data

Feb. 1, 1990 [JP] Japan .................. 2-20414

[51] Int. Cl.⁵ .............................. F02B 75/06
[52] U.S. Cl. .................. 123/192.1; 123/179.3
[58] Field of Search .......... 123/1 R, 2, 179 B, 179 D, 123/192 R, 436; 290/31, 34, 40 A, 51

[56] References Cited

U.S. PATENT DOCUMENTS

| | | | |
|---|---|---|---|
| 4,851,757 | 7/1989 | Zwicky et al. | 290/51 |
| 4,977,508 | 12/1990 | Tanaka et al. | 123/436 |
| 5,020,491 | 6/1991 | Mashino | 123/192 R |

FOREIGN PATENT DOCUMENTS 6345498 12/1973 Japan .
2042772 9/1980 United Kingdom ............. 123/436

Primary Examiner—Noah P. Kamen
Attorney, Agent, or Firm—Antonelli, Terry, Stout & Kraus

[57] ABSTRACT

An apparatus induces vibrations in a generator for effectively reducing vibrations of a vehicle engine and the vehicle body due to irregular combustion of the engine. The load torque of a generator fixed to the engine is changed to generate an angle moment on the body of the generator to cancel engine vibrations due to rough idling and suppress body vibrations due to the rough idling. Irregular combustion of the engine is detected from a change in the engine speed, and a voltage higher than the output voltage of the generator is than applied across the field winding to increase the field winding current and hence the load torque on the generator, which induces vibrations on the generator body. When the generator vibrations and vibrations due to irregular combustion are in inverse phase relationship to each other, they are cancelled.

6 Claims, 5 Drawing Sheets

F I G. 5
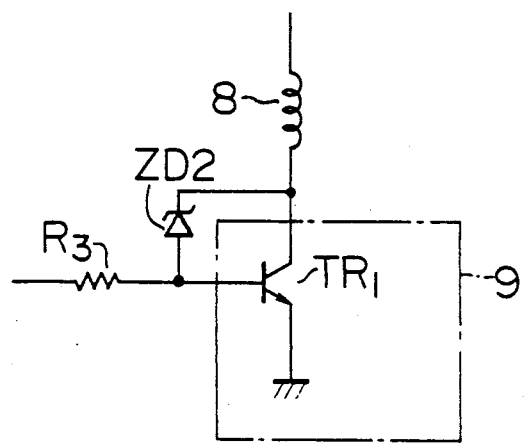
F I G. 6
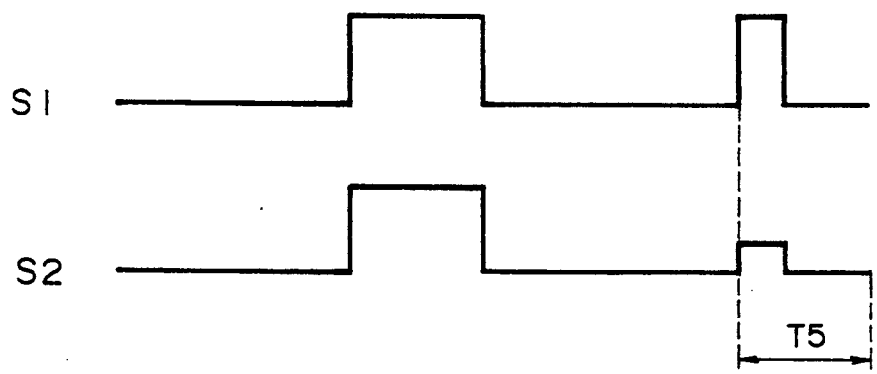

APPARATUS FOR REDUCING VIBRATIONS OF THE BODY OF A VEHICLE

BACKGROUND OF THE INVENTION

The present invention relates to apparatus for reducing vibrations of an engine and the body of a vehicle due to irregular combustion of the engine, using vibrations of a generator mounted on the engine.

Recently, the requirements for comfortable driving of a vehicle have become more server. For example, various proposals for reducing vibrations of the vehicle body during idling of the engine have been made conventionally. One example is to control a torque required for driving a generator provided on the engine to suppress vibrations of the engine to thereby reduce the vibrations of the vehicle body, as disclosed in Unexamined Japanese Patent Publication JP-B 63-45498 for the Japanese Patent Application filed by Mazda Motor Corporation on Jun. 10, 1982.

In the technique disclosed in this publication, periodic torque fluctuations or torque pulsations due to compression and combustion cycles in the engine are canceled by turning on and off the field coil current in the generator synchronously with those torque pulsations to thereby cancel the resulting generator drive torque and hence reduce the body vibrations.

This conventional technique, however, does not allow for non-periodic irregular combustion (irregular bad combustion) generated during idling, and cannot cope with a situation in which irregular combustion causes engine vibrations which are then transmitted to the vehicle body to thereby adversely affect the comfort of driving.

While the conventional technique can cope with periodic torque fluctuations, it does not allow for vibrations inherent in the engine and vehicle body due to torque vibrations generated at irregular periods.

The torque fluctuations generated at irregular periods include torque fluctuations due to incomplete combustion generated once in two seconds-one minute during idling and torque vibrations due to disturbance of fuel supply control occurring when the engine operation is rapidly changed to idling state from high speed running.

SUMMARY OF THE INVENTION

It is an object of the present invention to provide an apparatus for effectively reducing vibrations of a vehicle engine and the vehicle body due to irregular combustion of the engine, using possible vibrations of a generator mounted on the engine.

In the present invention, the load torque of a generator such as an alternator fixed to the engine is changed to generate an angle moment on the body of the generator to cancel engine vibrations due to rough idling and to suppress body vibrations due to the rough ilding.

In the inventive vibration suppressing apparatus, a generator is provided which has a voltage regulator to control a field winding current so as to output a constant voltage to a battery. The occurrence of irregular combustion of the engine is detected on the basis of a change in the engine speed. When irregular combustion is detected, a voltage higher than the output voltage of the generator is applied across the field winding to increase the field winding current and hence the load torque on the generator.

A change in the load torque of the generator induces vibrations on the generator body due to reaction. When the generator vibrations and vibrations due to irregular combustion are in inverse phase relationship to each other, they are canceled by each other to suppress those vibrations.

When irregular combustion appears in the engine, the engine speed greatly fluctuates and the engine vibrates in the direction of rotation around the output shaft.

Vibrations in the direction of this engine rolling causes the vehicle body to vibrate through the engine mount. Since the vehicle body is supported through tires, vibrations are likely to occur in the rolling direction especially in a FR (Front Engine Rear Drive) vehicle in which the engine is disposed in the longitudinal direction.

Thus, when the engine and vehicle body start to vibrate, they vibrate in opposite directions in respective predetermined times determined by the corresponding inherent vibration periods. If the load torque on the generator is increased at this time, the generator body vibrates due to reaction and its vibrations are transmitted to the engine.

Therefore, the engine vibrates in the rolling direction, and engine vibration due to irregular combustion and the reverse force act on each other to thereby reduce the engine vibration. In addition, the vehicle body vibration and the reverse force acts on the vehicle body through the engine mount to thereby reduce the vibration of the vehicle body.

Since the voltage supplied to an energizing coil of the generator is stepped up at this time, the load torque increases at an increased speed. Therefore, the responsiveness of control of the load torque on the generator is improved to thereby reduce the vibrations effectively.

BRIEF DESCRIPTION OF THE DRAWINGS

FIG. 5 is a circuit diagram of a modification of the FIG. 1 embodiment; and

FIG. 6 illustrates waveforms generated in the FIG. 5 circuit.

DESCRIPTION OF THE PREFERRED EMBODIMENTS

Embodiments of a vehicle body vibration reducing control apparatus according to the present invention will be described in more detail with reference to the drawings.

Figure 1:
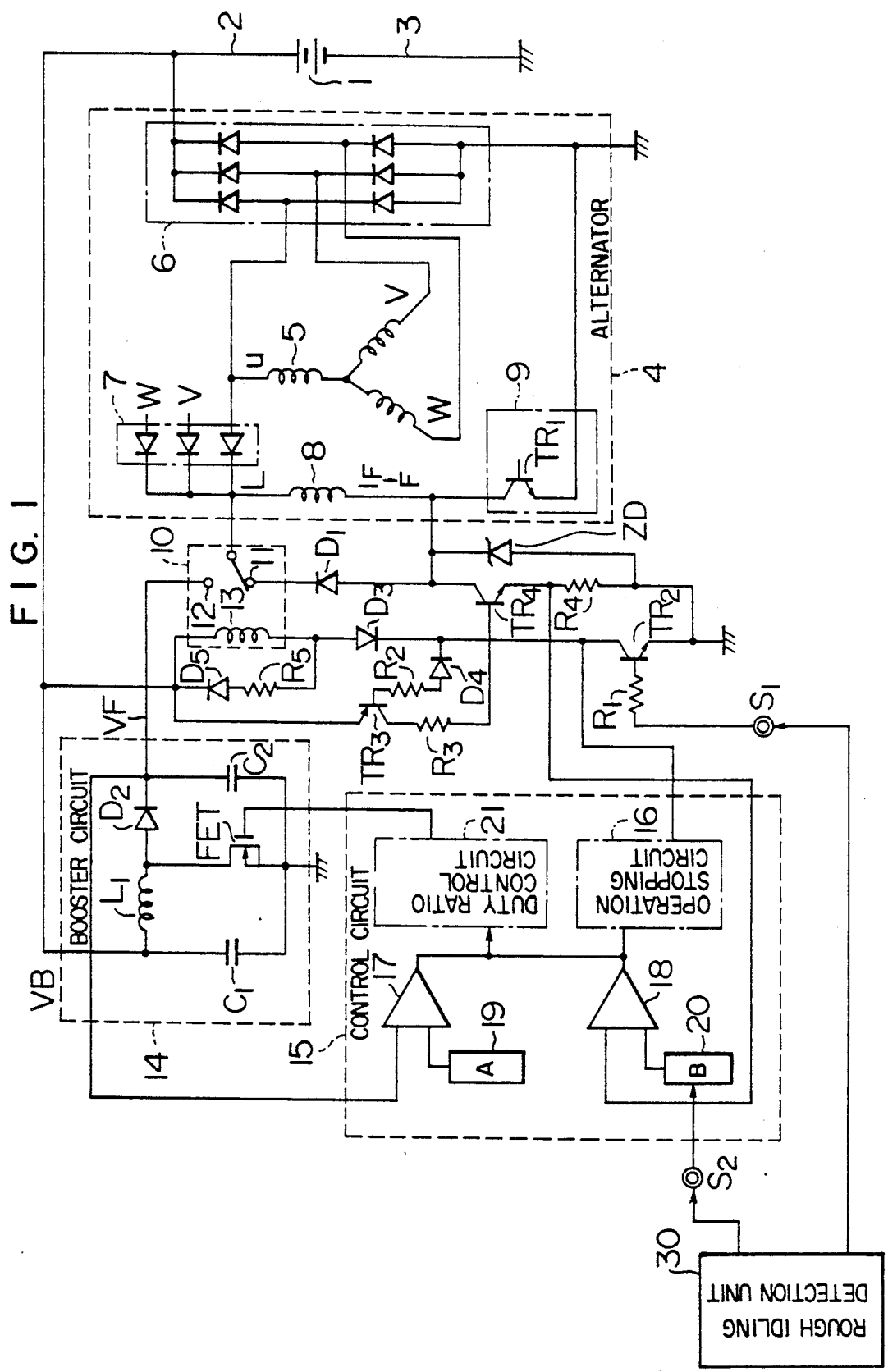
FIG. 1 is a circuit diagram indicative of the structure of a vehicle body vibration reducing apparatus according to the present invention.

FIG. 1 shows one embodiment of the present invention. In FIG. 1, the numeral 1 denotes a battery, 2, a positive power supply line; 3, a negative power supply line; 4, an alternator; 5, a stator (or armature) coil of the alternator; 6, a diode bridge; 7, a diode for an energizing power source; 8, a field coil of the alternator; 9, a voltage regulator for control of the field current; 10, a relay; 11, a b- (normally closed) contact of relay 10; 12, an a- (normally open) contact; 13, a relay coil; 14, a booster; 15, a control circuit; and 30, a rough idling detection unit.

The positive and negative power supply lines 2 and 3 of battery 1 are connected to alternator 4, and the respective phase windings U, V, W of stator coil 5 are connected to diode bridge 6 whose output terminal is connected to battery 1. The respective phase windings U, V, W of stator coil 5 are connected to the L-terminal of field coil 8 through corresponding diodes 7.

Transistor TR1 of voltage regulator 9 is connected across the F-terminal of field coil 8 and ground.

Free wheel diode D1 is connected in parallel with field coil 8 through the b-contact 11 of relay 10.

Alternator 4, thus structured, performs a regular operation and is driven by the engine to supply a generated current to battery 1.

The positive power source line 2 is connected to b-contact 12 of relay 10 in series with inductance L1 and diode D2. The input side of inductance L1 is grounded through capacitor C1 and the other end of the inductance is grounded through a field effect transistor FET. The cathode of diode D2 is grounded through capacitor C2. Thus booster 14 results.

Booster 14 provides a boosted output voltage $VF = VB \times T/TOFF$ where T is the switching period of field effect transistor FET, TOFF is the off time, and VB is the input voltage. Capacitors C1 are and C2 used to reduce a ripple current.

When rough idling detection unit 30 detects rough idling. It outputs a control command signal to terminals S1, S2. The details of rough idling detection unit 30 will be described in more detail later.

Control command signal terminal S1 is connected through resistor R1 to the base of transistor TR2, the collector of which is connected through diode D3 to coil 13 of relay 10. The collector of transistor TR2 is also connected to the base of transistor TR3 through a series connected circuit of diode D4 and resistor R2. The collector of transistor TR3 is connected to the base of transistor TR4 through resistor R3. The collector of transistor TR4 is connected to the F-terminal of field coil 8, and the emitter of transistor TR4 is connected to negative power supply line 3 through current detecting resistor R4. Zener diode ZD is connected across the F-terminal of field coil 8 and the negative power supply line 3. Relay coil 13 is connected in parallel with a series connected circuit of resistor R5 and diode D5.

Control circuit 15 includes operation stopping circuit 16 which operates to prevent the conduction ratio control circuit 21 from providing an output, voltage limiter 17 which limits output voltage VF, current limiter 18 which limits the current flowing through transistor TR4, and reference voltages (A) 19 and (B) 20 which define the corresponding voltage and current limits.

In operation, assume that engine speed N is decreased as shown in FIG. 2(a) due to the occurrence of incomplete combustion in some cylinders of the engine and fluctuations of the engine speed reach a predetermined value $\Delta N$. At this time, rough idling detection unit 30 outputs a signal of a pulse width T2 (FIG. 2(b)) to S1 command signal terminal a time T1 after its detection.

Figure 2:
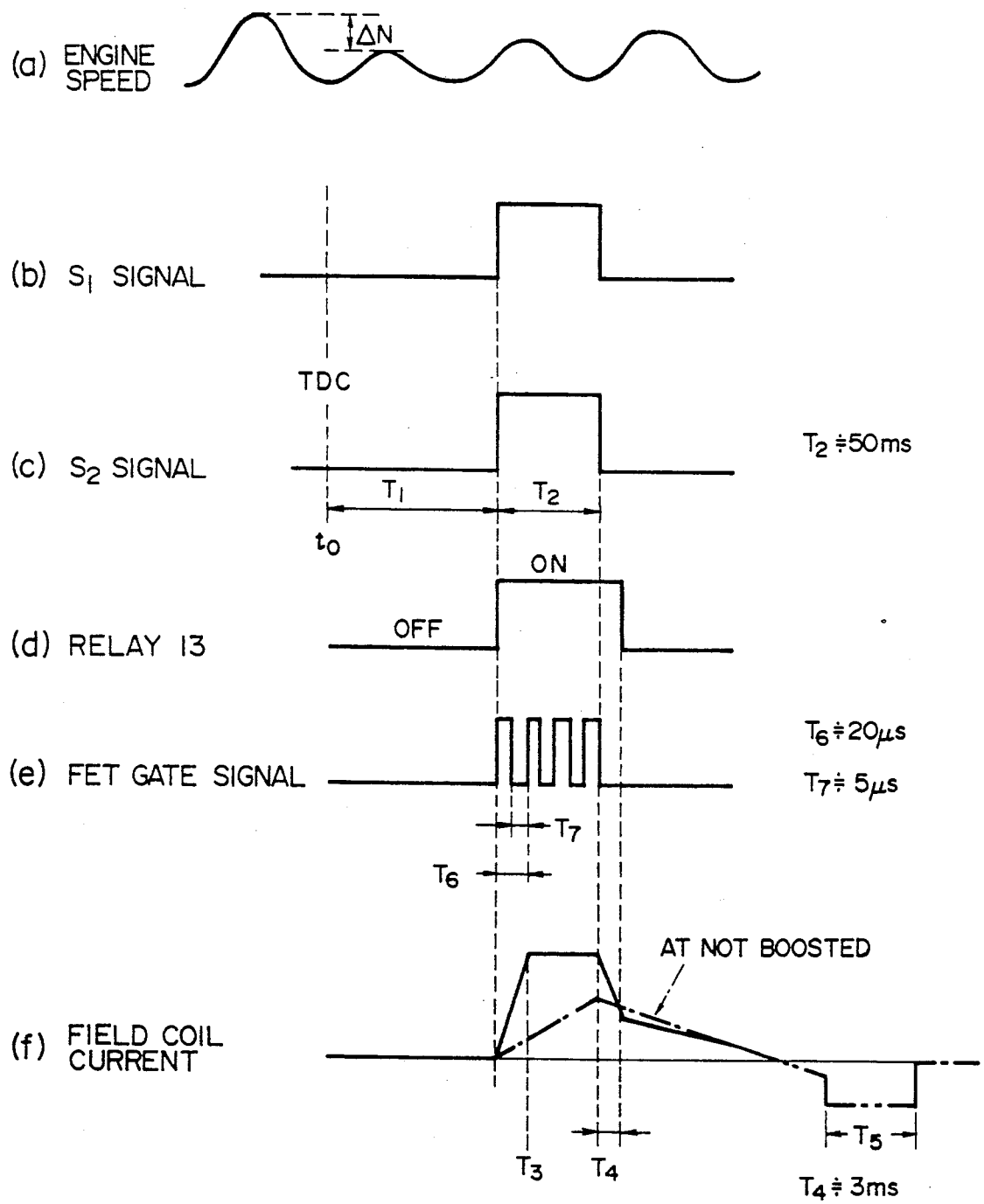
FIG. 2 is a diagram of operating waveforms in FIG. 1 embodiment.

In FIG. 2, time t0 which is the starting point of interval T1 shows a TDC (Top Dead Center) at which time incomplete combustion starts. Then speed fluctuation $\Delta N$ is detected.

Figure 3:
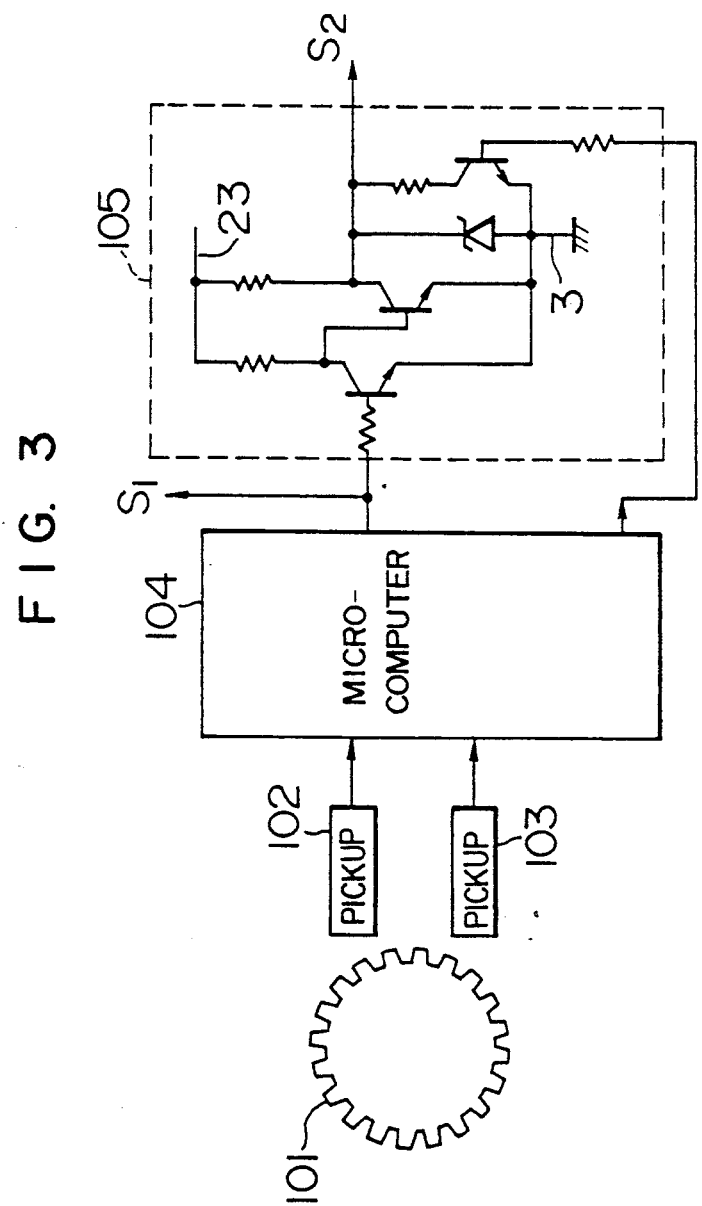
FIG. 3 is a detailed circuit diagram of a rough idling detection unit of the FIG. 1 embodiment.

The structure and operation of rough idling detection unit 30 will be described with reference to FIG. 3 which illustrates the structure of detection unit 30. The numeral 101 denotes a ring gear which is directly connected to a crank shaft (not shown) of the engine and rotates synchronously with engine rotation. Disposed in the vicinity of the teeth of the ring gear 101 are electromagnetic pickups 102, 103 which output a pulse each time the respective teeth of the gear 101 pass by the pickups. Pickup 102 is for detecting engine speed while pickup 103 detects a reference position, for example, a top dead center of the engine. The respective pulse outputs from the pickups are input to microcomputer 104 to calculate the engine speed and also to detect a change in the engine speed. Microcomputer 104 outputs to S1 a command signal to increase the field current a predetermined time T1 after top dead center position timing t0 when speed change $\Delta N$ for rotation through a predetermined crank angle exceeds the predetermined value. The signal output to S2 terminal has the same phase and width as the signal at the S1 terminal, but the amplitude level thereof is changed by circuit 105. The engine speed may be changed by measuring a change in the rotational acceleration and rough idling may be detected by comparing the change with a predetermined value.

If speed fluctuation $\Delta N$ is detected, signals S1, S2 are generated an interval T1 corresponding to one half of the vibration period of the vehicle body after time TDC. Interval T1 may be one half of the inherent vibration period of the engine. Signals S1, S2 may be generated after one half of both the inherent vibration periods has passed.

Rough idling detection unit 30 simultaneously generates signal S2 used for generation of a voltage Vc (which limits the field current value) defining the field current in alternator 4.

Command signal S1 is generated in the same way, and transistor TR2 is rendered conductive to close the a-contact 12 of relay 10. As a result, transistors TR3, TR4 are rendered conductive to thereby shunt transistor TR1 to increase the current in the field coil 8.

Command signal S1 releases the operation of operation stopping circuit 16 of control circuit 15 and the output of conduction ratio control circuit 21 causes booster 14 to operate. Since the output voltage VF of booster 14 is set so as to be about 4 times as high as input voltage VB, field current IF rises at a quadrupled speed. When the field current arrives at its upper limit, current limiter 18 operates to reduce the output voltage VF of booster 14.

If command signal S1 disappears, transistors TR2-TR4 are rendered non-conductive to stop booster 14.

At this time, a recirculating current flows through coil 13 because the series connected circuit of resistor R5 and diode D5 is connected in parallel with coil 13 of relay 10 to thereby delay the opening of the a-contact 12 (about 3 ms).

As a result, field current IF flows through Zener diode ZD. By setting the blocking voltage of Zener diode ZD to about 48 volts, the current can fall more rapidly than when free wheel diode D1 is connected.

The above operation is illustrated using the characteristic diagram of field current IF of FIG. 2. It is shown that a current limitation is performed at time T3. Time T4 shows that the b-contact 11 of relay 10 is still open and that field current IF is falling rapidly.

In the waveform diagram of FIG. 2, (e) shows the waveform of a gate signal for the FET in the booster 14. Duty cycle control circuit 21 responds to a command signal at terminal S1 to generate that gate signal to turn on and off the FET. The broken line indicative of the field current shown by (f) shows the characteristic obtained when no boosted-up voltage is applied to the field coil. The inventive characteristic shown by the solid line and obtained when the boosted-up voltage is applied to the field coil is more rapid in rise and fall and hence excellent responsiveness results.

Figure 4:
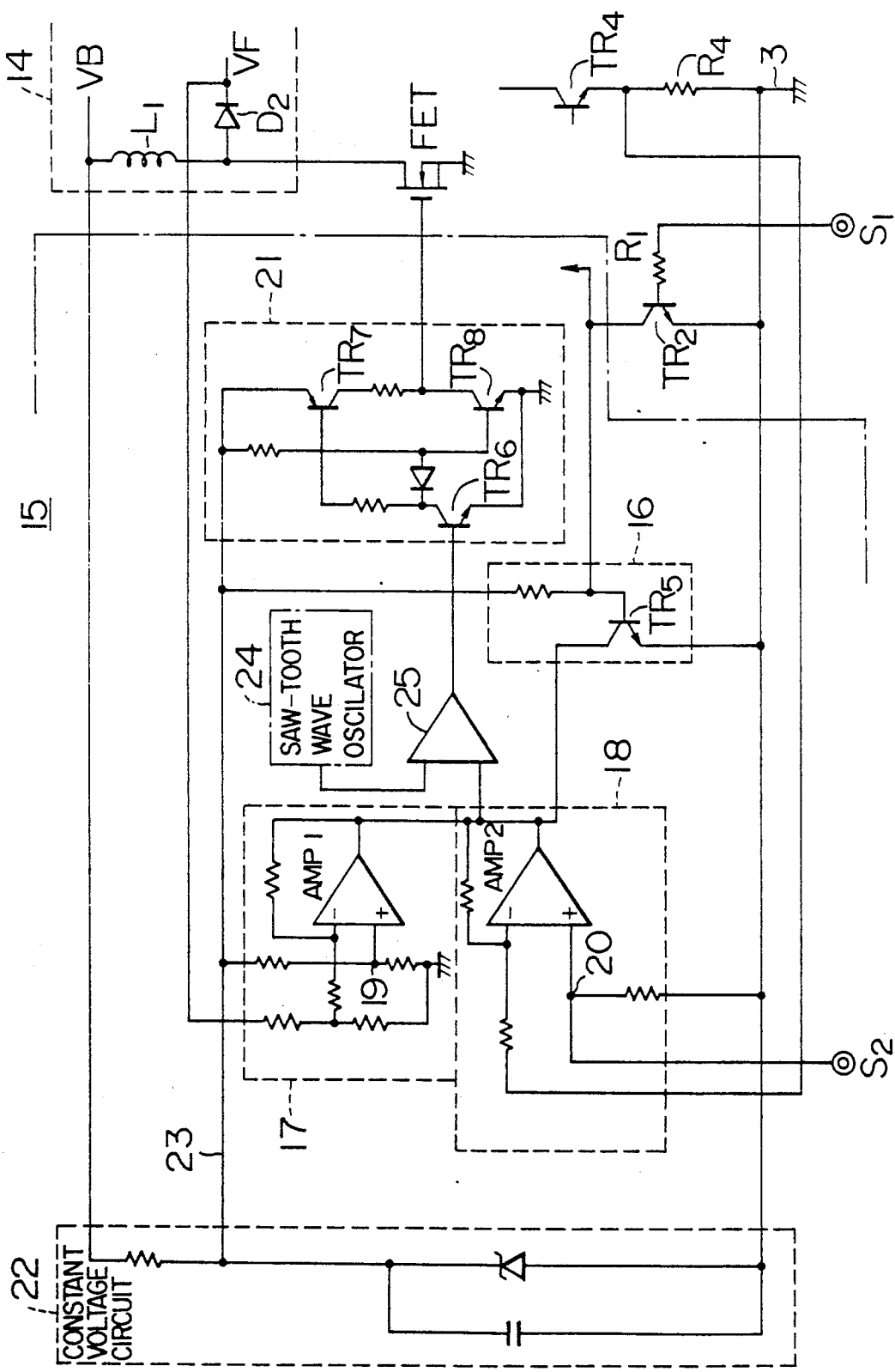
FIG. 4 is an internal circuit diagram of a control circuit of the FIG. 1 embodiment.

FIG. 4 shows the details of control circuit 15. A constant voltage from constant voltage circuit 22 is supplied to constant voltage line 23. The output of comparator 25, which compares the output voltages of saw-tooth oscillator 24 which outputs a saw-tooth waveform signal and amplifier AMP, is amplified by conduction ratio output circuit 21 of transistors TR6-TR8 and the resulting signal is delivered to an FET of booster 14. Transistors TR7 and TR8 are used in a totem pole connection to apply a switching signal having a rapid rise and fall waveform to the gate of field effect transistor FET.

Transistor TR5 of operation stopping circuit 16 is normally conductive and is rendered non-conductive when it receives a signal at terminal S1, at which time conduction ratio control circuit 21 generates a pulse.

Therefore, according to this embodiment, the operation interval of booster 14 is suppressed to a minimum value to thereby prevent a current higher than a regular one from flowing through field coil 8 of alternator 4 to increase the resulting generated voltage and to increase the charging current to battery 1.

FIG. 5 shows another embodiment of the present invention which is the same in constructure and effect as the FIG. 1 embodiment except that Zener diode ZD2 replaces transistors TR1 and TR4 and Zener diode ZD of FIG. 1.

The booster in the present invention may be a push-pull converter system using a transformer or a doubling circuit system using the charging of a capacitor to obtain similar effects in addition to the above embodiment.

If battery 1 is charged to about 100% of its full charge capacity in the above embodiment, field coil current IF is as shown by the broken line in FIG. 2 (because voltage regulator 9 renders transistor TR1 non-conductive in response to an increase in the voltage.

As a result, when there is a load on battery 1, voltage fluctuations occur for interval T5 of FIG. 2, which instantaneously reduces the brightness of a lamp or the like if it is lit.

In the present embodiment, command signals S1 and S2 are arranged to take a waveform as shown in FIG. 6 such that they are generated with a predetermined width during interval T5 so as to supply a predetermined low current from booster 14 to field coil 8 to prevent a reduction in the brightness of the lamp or the like.

Therefore, according to the present embodiment, the voltage applied to field coil 8 is boosted up, so that a rise in the field current is speeded up, and the torque of alternator 4 responds rapidly. As a result, timing for reducing vibrations of the vehicle body is easily set to thereby reduce vibrations effectively.

When the current flowing through field coil 8 increases, the voltage generated by alternator 4 and the resulting current increase. Thus, the torque absorbed by alternator 4 increases. By adjusting the field coil current, the torque of the alternator can be adjusted.

As a result, according to the above embodiment, if command signal S2 is changed in accordance with a speed fluctuation ΔN of the engine, the alternator torque can be adjusted to thereby provide optimal control.

In order to rapidly reduce the current in the field coil 8 in the present embodiment, the current energy supplied to field coil 8 is first absorbed by Zener diode ZD, and discharged after free wheel diode D1 is connected. As a result, the current flowing through field coil 8 and the torque of the alternator 4 are rapidly reduced. This implies that the torque can be controlled in a pulsating manner to thereby reduce vibrations of the vehicle body more effectively.

According to the present invention, since the generator torque increases for a predetermined time, which is determined by at least one of the inherent vibration periods of the engine and vehicle body, after the detection signal from engine speed fluctuation detecting circuit arises, the inherent vibrations of the engine and vehicle body can be reduced.

In addition, the voltage applied across the field coil of the alternator is very high compared to the battery voltage, so that a rise in the field coil current is speeded up and the torque of the alternator is rapidly increased.

Since the field current value can be controlled, the alternator torque can also be controlled.

Since the current flowing through the field coil can rapidly be reduced, the alternator torque can rapidly be reduced.

Therefore, according to the present invention, since the response to a command is speeded up and control to the command value is achieved, control to reduce vibrations of the vehicle body due to vibration of the engine is ensured to thereby reduce the vibrations.

What is claimed is:

1. An apparatus for reducing vehicle body vibrations due to irregular combustion in an engine in a vehicle, comprising:
   a generator attached to the vehicle engine and including a voltage regulator for controlling field winding current of the generator such that a predetermined voltage is output to a battery;
   means for detecting an occurrence of irregular combustion in the engine on the basis of at least a change in the engine speed;
   means responsive to a detection of irregular combustion for generating a command signal to command an increase in the field winding current a predetermined time after the detection of the irregular combustion, the predetermined time being determined by the inherent vibration period of one of the engine and the vehicle body;
   a high voltage circuit responsive to the command signal for generating a voltage higher than the output voltage of said generator for a predetermined time; and
   means responsive to the command signal for applying the voltage generated by said high voltage circuit to the field winding to increase the field current and hence the load torque on said generator.

2. An apparatus according to claim 1, further comprising a free wheel diode circuit for absorbing a possible surge current generated in the field winding, wherein said voltage applying means comprise switching means selectively connecting said high voltage circuit or said free wheel diode circuit to said field winding.

3. An apparatus according to claim 2, wherein said switching means has a time constant in the switching operation and switches the field winding from said high voltage circuit to said free wheel diode circuit after a time corresponding to the time constant following the disappearance of the command signal, and said apparatus further comprises another circuit for absorbing a possible surge current generated in the field winding during an interval of the time constant.

4. An apparatus according to claim 3, wherein said other circuit for absorbing the surge current includes a Zener diode circuit connected across one end of the field winding and ground, and wherein the Zener diode circuit is rendered conductive when the voltage at the junction point of the field winding and the Zener diode circuit exceeds a predetermined value.

5. An apparatus according to claim 1, further comprising means for comparing the voltage across the field winding and a predetermined reference value and for outputting an output signal when the voltage across the field winding exceeds the reference value, and means responsive to the output signal of said comparing means for suppressing the output voltage of said high voltage circuit.

6. An apparatus according to claim 1, wherein the means for detecting an occurrence of irregular combustion includes means for detecting engine speed and means for calculating a change in the engine speed within a predetermined crank angle and for determining that irregular combustion has occurred when the change in the engine speed exceeds a predetermined value.

* * * * *